(12) United States Patent  
Postnikov et al.

(10) Patent No.: US 8,019,736 B1  
(45) Date of Patent: Sep. 13, 2011

(54) SYSTEMS AND METHODS FOR COMBINING A PLURALITY OF TERRAIN DATABASES INTO ONE TERRAIN DATABASE

(75) Inventors: Alex Postnikov, Cedar Rapids, IA (US); Jason C. Wenger, North Liberty, IA (US); Karen L. Walling, Cedar Rapids, IA (US); Andrew M. Pelzer, Atalissa, IA (US); Victoria C. Bowman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 415 days.

(21) Appl. No.: 11/881,112

(22) Filed: Jul. 25, 2007

(51) Int. Cl.
- G06F 7/00 (2006.01)
- G06F 17/00 (2006.01)
- G06F 17/30 (2006.01)
- G06T 17/00 (2006.01)

(52) U.S. Cl. ......... 707/693; 707/694; 707/808; 345/428

(58) Field of Classification Search .................. 707/101, 707/693, 694, 808; 345/428
See application file for complete search history.

(56) References Cited

U.S. PATENT DOCUMENTS

| | | | | |
|---|---|---|---|---|
| 5,264,848 A * | 11/1993 | McGuffin | | 341/94 |
| 5,317,689 A * | 5/1994 | Nack et al. | | 345/505 |
| 6,020,893 A * | 2/2000 | Freeman | | 345/428 |
| 6,092,009 A * | 7/2000 | Glover | | 701/14 |
| 6,122,570 A | 9/2000 | Muller et al. | | |
| 6,138,060 A | 10/2000 | Conner et al. | | |
| 6,219,592 B1 | 4/2001 | Muller et al. | | |
| 6,298,342 B1 * | 10/2001 | Graefe et al. | | 707/4 |
| 6,456,288 B1 * | 9/2002 | Brockway et al. | | 345/428 |
| 6,496,189 B1 * | 12/2002 | Yaron et al. | | 345/428 |
| 7,098,913 B1 | 8/2006 | Etherington et al. | | |
| 7,123,260 B2 * | 10/2006 | Brust | | 345/428 |
| 7,145,501 B1 * | 12/2006 | Manfred et al. | | 342/120 |
| 7,366,736 B1 * | 4/2008 | Woodard | | 345/428 |
| 7,538,769 B2 * | 5/2009 | Hoppe | | 345/428 |
| 2001/0027456 A1 * | 10/2001 | Lancaster et al. | | 707/104.1 |
| 2002/0116126 A1 * | 8/2002 | Lin | | 701/214 |
| 2003/0085896 A1 * | 5/2003 | Freeman | | 345/428 |
| 2007/0143377 A1 * | 6/2007 | Waites | | 707/205 |
| 2008/0119970 A1 * | 5/2008 | Campbell et al. | | 701/8 |
| 2008/0209007 A1 * | 8/2008 | Gurecki et al. | | 709/218 |

* cited by examiner

*Primary Examiner* — John Breene  
*Assistant Examiner* — Mark E Hershley  
(74) *Attorney, Agent, or Firm* — Matthew J. Evans; Daniel M. Barbieri

(57) ABSTRACT

A present novel and non-trivial system and methods for exacting terrain elevation data contained in a plurality of terrain elevation databases or data sets, combining the terrain elevation data contained in each terrain elevation data set to produce a single, combined terrain database of a common resolution. A system is disclosed that could provide a processor with terrain elevation data from a plurality of terrain elevations data sets having differing resolution and accuracy parameters, a per-point error metric data from a plurality of error metric data sets, and a common resolution parameter. A method is disclosed which for combining terrain elevation data sets having difference resolutions into a single, combined terrain elevation data set having a common resolution utilizing a per-point error metric data from a plurality of error metric data sets. A second method is disclosed for combining a plurality of terrain elevation data sets having different resolutions into terrain elevation data of a single, combined terrain elevation data set having a common resolution by transforming the plurality of terrain elevation data sets into a plurality of terrain frequency data sets and filtering the terrain frequency data sets utilizing a Kalman filter.

15 Claims, 3 Drawing Sheets

SYSTEMS AND METHODS FOR COMBINING A PLURALITY OF TERRAIN DATABASES INTO ONE TERRAIN DATABASE

BACKGROUND OF THE INVENTION

1. Field of the Invention

This invention pertains to terrain elevation databases as applied in the field of avionics. The embodiments herein contain a system and methods for combining a plurality of terrain elevation databases having varying resolutions and parameters into a single database of a common resolution.

2. Description of the Related Art

Beginning in the early 1970's, a number of studies looked at the occurrence of "controlled flight into terrain" (CFIT)-type accidents, where a properly functioning airplane under the control of a fully qualified and certificated crew is flown into terrain (or water or obstacles) with no apparent awareness on the part of the crew. Findings from these studies indicated that many such accidents could have been avoided if a warning device called a ground proximity warning system ("GPWS") was used. Thereafter, advances in terrain mapping technology permitted vendors and designers of avionics equipment to develop newer type of GPWS that provides greater situational awareness for flight crews. The U.S. Federal Aviation Administration ("FAA") has classified such systems as Terrain Awareness and Warning Systems ("TAWS").

The advancement of technologies—more precise navigation systems, increased computer memory storage, and better display technology—have allowed further development of in the common features of TAWS: (1) use of airplane position information from the aircraft's navigation system(s), (2) an onboard terrain database, and (3) a means of displaying the surrounding terrain. Aircraft position information from the aircraft's navigation system is fed to a TAWS computer. The TAWS computer compares the airplane's current position and flight path with the terrain database associated with the system. If there is a potential threat of collision with terrain, the TAWS computer sends warning alerts to the airplane's audio system.

Regarding onboard terrain databases, various vendors and designers of avionics equipment have developed databases that have been, for all intents and purposes, proprietary in nature. Past and recent advances have made significant efforts to obtain digital elevation models of the Earth, generating a high-resolution digital topographical database. Governing authorities have been a primary source of gathering and compiling terrain elevation data into terrain databases on a large scale. For instance, the U.S. Geological Society ("USGS") developed GTOPO30, a global digital elevation model ("DEM"). GTOPO30 terrain elevation data was derived from eight sources of data including Digital Terrain Elevation Data ("DTED"), Digital Chart of the World ("DCW"), USGS Digital Elevations Models ("DEM"), Army Map Services ("AMS") Maps, International Map of the World ("IMW"), Peru Map, New Zealand DEM, and Antarctic Digital Database ("ADD"). The release of GTOPO30 represented the completion of global coverage of low-resolution elevation data; the resolution of GTOPO30 is generally thirty arc seconds (or approximately one kilometer). While the whole coverage of the terrain elevation data is positive, the low-resolution elevation data is not advantageous for a system such as TAWS because changes in terrain are reported at a one kilometer interval.

In February 2000, the Space Shuttle Endeavour acquired elevation data on a near-global scale during mission STS-99. In an international research effort known as Shuttle Radar Topography Mission ("SRTM"), a DEM was generated producing the most complete high-resolution digital topological database of Earth to date; the resolution is generally one arc second (or approximately 30 meters), thereby providing much greater detail than that provided with GTOPO30 data set. While the resolution of the terrain elevation data set is positive, there are three significant drawbacks of SRTM. First, the coverage extended from 56° South latitude to 60° North latitude only. Second, the SRTM terrain elevation data set is affected by mountainous and desert areas. Mountain summits of the Alpine and Andes ranges, and many gorges and canyons contain voids in the data. Third, at the present time, the resolution of one arc second is available over the United States territory only; the rest of the world is available at three arc seconds resolution.

The three-dimensional DEM data may also be categorized as a set of frequencies in two dimensions for the purposes of digital signal processing. One dimension may be North and the other may be East. Data characterized in this manner will have differences in frequency content. For example, GTOPO30 data set provides a very smooth surface with very few abrupt changes in elevations; it is low resolution, continuous, and virtually free of high-frequency noise. On the other hand, SRTM terrain elevation data set is high resolution and often contains high-frequency noise that may have been caused by radar artifacts of the Interferometric Synthetic Aperture Radar technique employed during the Shuttle mission to acquire the SRTM data.

Accordingly, each set of a plurality of terrain elevation data sets have advantages and disadvantages associated with it.

BRIEF SUMMARY OF THE INVENTION

The embodiments disclosed herein present novel and nontrivial system and methods for exacting terrain elevation data contained in a plurality of terrain elevation databases or data sets, combining the terrain elevation data contained in each terrain elevation data set to produce a single, combined terrain database of a common resolution.

In one embodiment herein, a system is disclosed that could provide a processor with terrain elevation data from a plurality of terrain elevations data sets having different resolutions and accuracy parameters, per-point error metric data from a plurality of error metric data sets, and a common resolution parameter. With such input, the processor combines the terrain elevation data from the plurality of terrain elevation data sets to form a single, combined terrain elevation data base set with having common resolution.

In another embodiment herein, a method is disclosed which for combining terrain elevation data sets into a combined terrain elevation data set having a common resolution by determining a weighted average of the plurality of terrain data sets. This method could provide the combined terrain elevation data set after receiving as input a plurality of terrain datasets having different resolutions and file formats, a common resolution parameter, and a plurality of error metric data sets for use as weights.

In another embodiment herein, a second method is disclosed for combining a plurality of terrain elevation data sets into a combined terrain elevation data set having a common resolution by utilizing a Kalman filter to filter out noise that may accompany terrain data sets. This method could provide the combined terrain elevation data set after receiving as input a plurality of terrain datasets having different resolutions and file formats, and a common resolution parameter.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
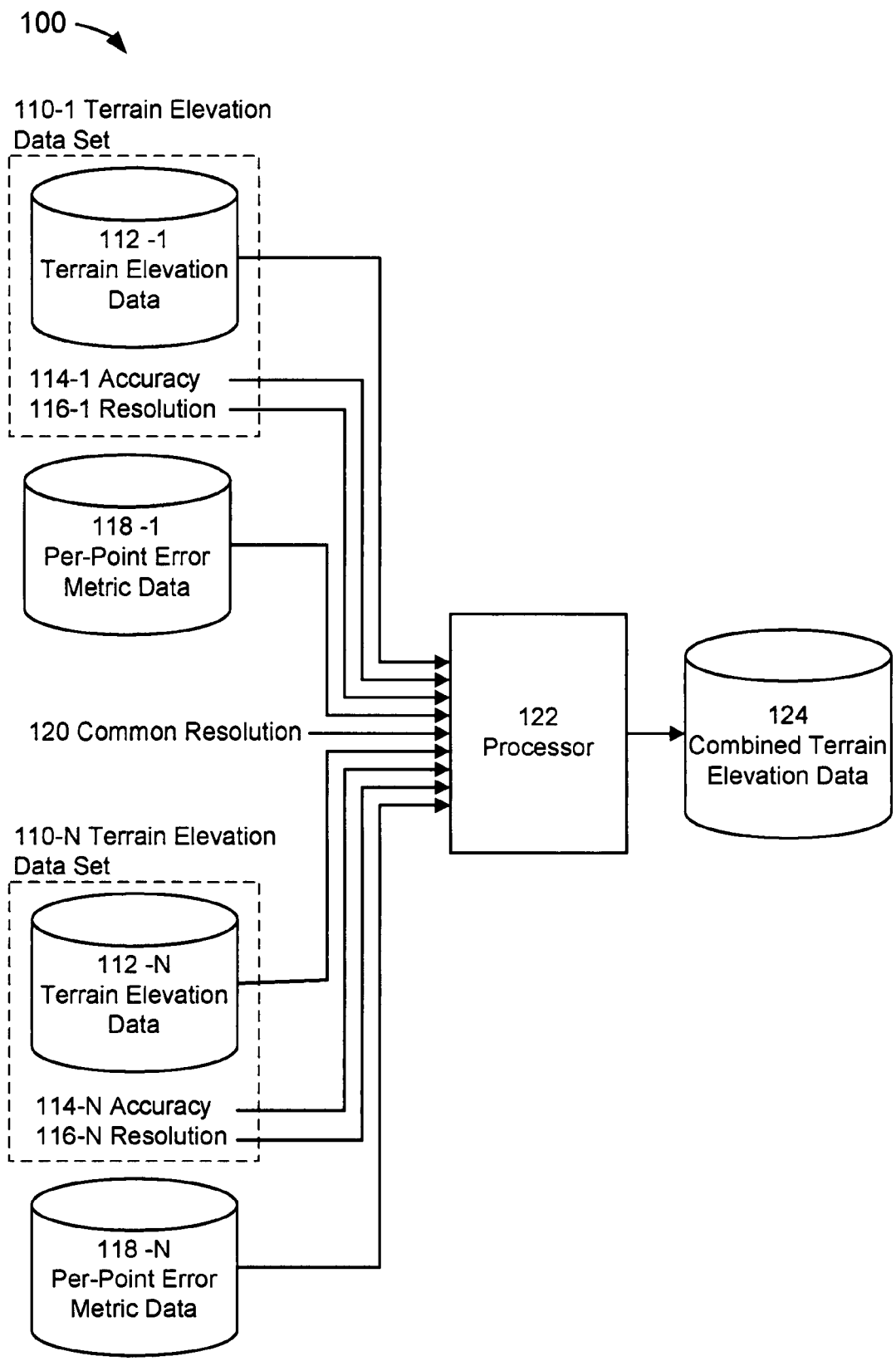
FIG. 1 depicts a block diagram of a system for combining a plurality of terrain elevation databases or data sets into a single terrain elevation database having a common resolution.

FIG. 1 depicts a system 100 for combining a plurality of terrain databases into one database which is suitable for implementation of the techniques described herein. The system may be comprised of a plurality of terrain elevation data sets 110-1 to 110-N (collectively, singular or plural, "terrain data sets 110"), a plurality of per-point error metric data 118-1 to 118-N (collectively, "per-point error metric data 110"), a common resolution parameter 120, a processor 122 and combined terrain elevation data set of database 124.

Terrain elevation data sets 110 may include a plurality of terrain elevation databases containing terrain elevation data 112-1 to 112-N sets (collectively, "terrain elevation data 112"), accuracy parameters 114-1 to 114-N (collectively, "accuracy parameters 114"), and resolution parameters 116-1 to 116-N (collectively, "resolution parameters 116"). Terrain elevation data sets may be stored in files having differing formats. Terrain elevation data sets 110, terrain elevation data 112, and all other data sets and data discussed herein may consist of software or source code stored, permanently or temporarily, in a digital memory storage device or computer-readable media including, but not limited to, RAM, ROM, CD, DVD, hard disk drive, diskette, solid-state memory, PCMCIA or PC Card, secure digital cards, and compact flash cards.

Terrain elevation data 112 could be that data which is contained in terrain data sets 110 as contained in digital elevation models. Digital elevation models have been produced by private sources and governmental authorities and have recently become widely available to the public as a whole without cost or for a nominal fee. Examples illustrative of digital elevation models containing terrain data sets 110 include, but are not limited to, SRTM, GTOPO30, DTED, DCW, DEM, AMS maps, IMW maps, Peru map, New Zealand DEM, and ADD. As embodied herein, terrain elevation data 112 could be provided to processor 122 for subsequent processing.

As embodied in FIG. 1, accuracy parameters 114 could be values that reflect the accuracy of the terrain elevation data 112 associated with digital elevation models. Accuracy parameters 114 may be expressed as a linear error at a confidence level. The range of accuracy parameters 114 for each digital elevation model varies widely. To illustrate, an accuracy parameter 114 of DCW has been stated as plus of minus 650 meters at 90 percent confidence level, and DTED and DEM have been stated as plus or minus 30 meters linear error at the 90 percent confidence level. Although each terrain elevation data set 110 is shown as having one accuracy parameter, the set may have a plurality of accuracy parameters within the set. As such, accuracy parameters 114 is not intended to be narrowly construed but to encompass all accuracy parameters that may be associated with a terrain elevation data. As embodied herein, accuracy parameters 114 could be provided to processor 122 for subsequent processing.

As embodied in FIG. 1, resolution parameters 116 could be values that reflect the resolution of the terrain elevation data 114 associated with digital elevation models. Resolution parameters may be expressed in distance or arc seconds (an arc second being approximately equal to 30 meters). The range of resolution parameters 116 for each digital elevation model varies widely. To illustrate, a resolution parameter 116 of GTOPO30 has been stated as 1 kilometer, DTED and DEM as 3 arc seconds, and SRTM as 1 arc second over United States territory and 3 arc seconds for the rest of the world. Although each terrain elevation data set 110 is shown as having one resolution parameter, the set may have a plurality of resolution parameters within the set. As such, resolution parameters 116 is not intended to be narrowly construed but to encompass all resolution parameters that may be associated with a terrain elevation data. Resolution parameters 116 could be provided to processor 122 for subsequent processing.

In an embodiment herein, error metric data sets (not depicted) include per-point error metric data 118-1 to 118-N sets (collectively, "per-point error metric data 118"). Per-point error metric data 118 may include a plurality of values that correspond to the plurality of values comprising terrain elevation data 112, and for each value found in terrain elevation data 112 there could be a corresponding per-point metric value. For example, terrain elevation data 112 that could make up a terrain data set 110 consisting of a 10×10 matrix may have a corresponding 10×10 matrix comprising an error metric data set of per-point error metric data 118.

For the purposes of illustrating an embodiment of this invention, assume there are three terrain data sets 110. The terrain elevation data 112-1 of a first terrain data set 110-1 could be low quality, and the per-point metric data 118-1 of a first error metric set may each be assigned a value of 0.10. Likewise, the terrain elevation data 112-2 of a second terrain data set 110-2 could have better quality than the first, and the per-point metric data 118-2 of a second error metric set may each be assigned a value of 0.30. The terrain elevation data 112-3 of a third terrain data set 110-3 could have the best quality of the three, and the per-point metric data 118-3 of a third error metric set would each be assigned a value of 0.60. It should be noted that each value of per-point metric data within an error metric data set may differ, but corresponding values across the plurality of error metric data sets 118 should be normalized to one.

As embodied in FIG. 1, a common resolution parameter 120 is received by the system 100. A common resolution parameter 120 could be resolution that will be common to a combined terrain elevation database 124. A processor 122 could receive as input terrain elevation data 112, accuracy parameters 114, resolution parameters 116, per-point error metric data 118, and a common resolution parameter 120. In an embodiment herein, the processor 124 could conform resolution parameters 116 into the common resolution. In another embodiment, processor 124 could weight the terrain elevation data 112 of the terrain data sets 110 with the per-point metric data 118 of the error metric data set and combine the weighted terrain elevation data 112 to produce a combined terrain data set or database 124 of common resolution. In another embodiment herein, the processor 122 could transform the terrain elevation data 112 of the terrain data sets 110 into terrain frequency data (not shown) of terrain frequency sets (not shown) comprising a set of frequencies in two dimensions. In another embodiment herein, the processor 122 could filter the terrain frequency data of the terrain frequency sets utilizing a Kalman filter to produce a combined terrain data set or database 124 of a common resolution.

It should be noted that the processor 122 may comprise of any electronic data processing unit which executes software or source code stored, permanently or temporarily, in a digital memory storage device or computer-readable. A common example of an electronic data processing unit is a microprocessor; however, for the embodiments herein, the term processor is not limited to the microprocessor and its meaning is not intended to be construed narrowly. For instance, a processor could also consist of more than one electronic data processing units.

Figure 2:
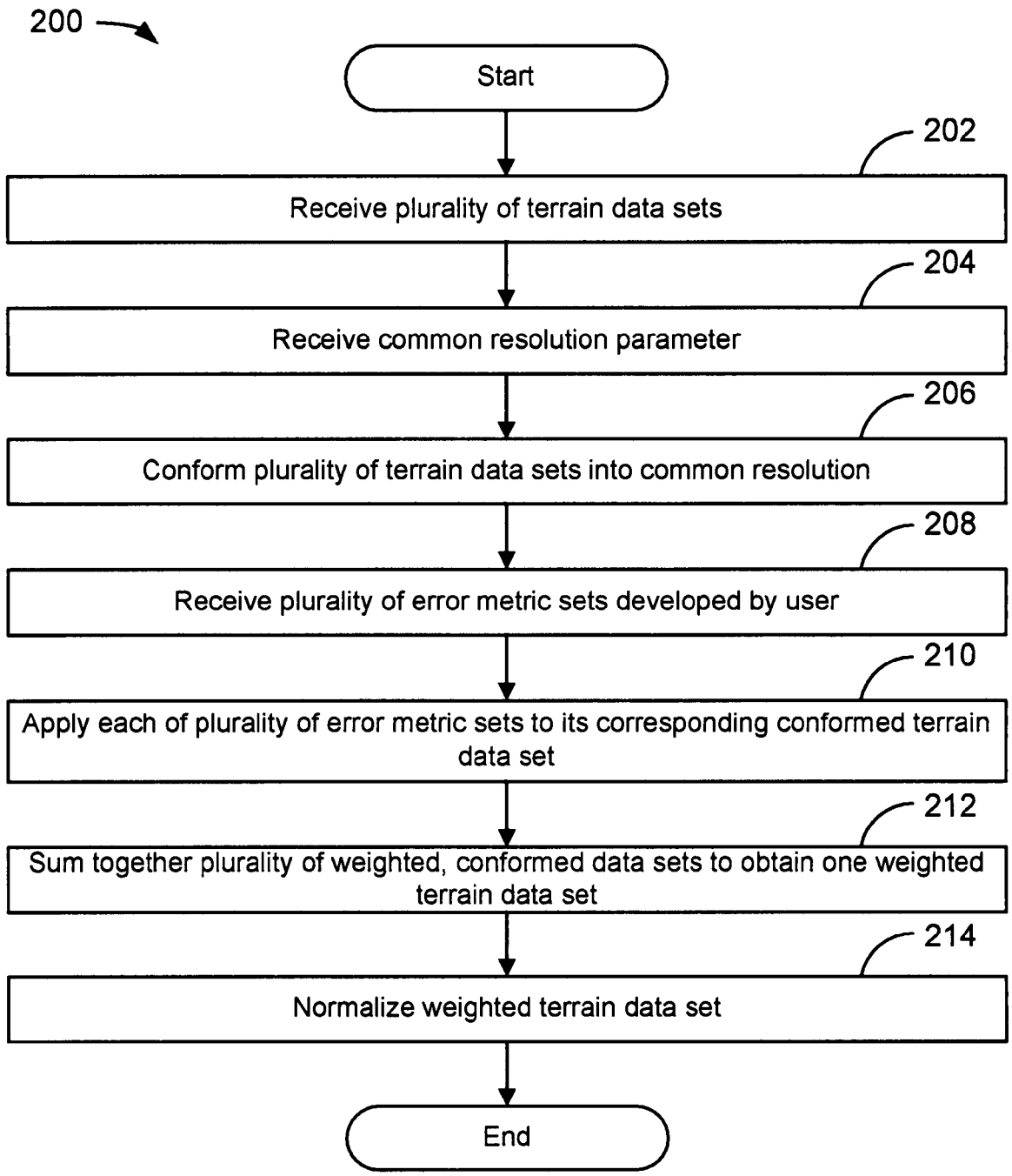
FIG. 2 depicts a flowchart illustrating a per-point error metric method for combining terrain elevation data from a plurality of terrain elevation data sets into terrain elevation data of a single, combined terrain elevation data set having a common resolution.

FIG. 2 depicts flowchart 200 of an example of a method for combining a plurality of terrain databases into one terrain database. The flowchart begins with module 202 with the receiving of a plurality of terrain data sets 110. In an embodiment, each of the plurality of terrain data sets 110 may be stored in different file formats. The flowchart continues to module 204 with the receiving of a common resolution parameter 120, a parameter which could be the resolution of a combined terrain data set or database 124. The flowchart continues to module 206 with the conforming of the plurality of terrain data sets 110 to a common resolution 120. In an embodiment, if any of the plurality of terrain data sets 110 is stored in different file formats, the conforming step of the method could include the conversion of the differing file formats into one. In addition, this method could determine those databases that do not have the same resolution of the common resolution 120 and modify their respective resolutions either upward or downward so that they may match the resolution that will be common to the combined database.

The flowchart continues to module 208 with the receiving of a plurality error metric sets 118. Each error metric set 118 may correspond to a terrain data set 110 and include per-point metric data, and each error metric set 118 may correspond to one of the plurality of terrain data sets 110. The flowchart continues to module 210 with the application of each error metric set 118 as a weighting factor to its corresponding one of the plurality of conformed terrain data sets 110. The flowchart continues to module 212 with the combining via summation of the plurality of weighted, conformed terrain data sets into one weighted terrain data set. The flowchart continues to module 214 with the normalizing of the weighted terrain set if the sum of the plurality of error metric data sets is greater than one; if so, then normalization could include dividing the weighted data set by the sum of the error metric data sets. Then, the flowchart proceeds to the end.

Figure 3:
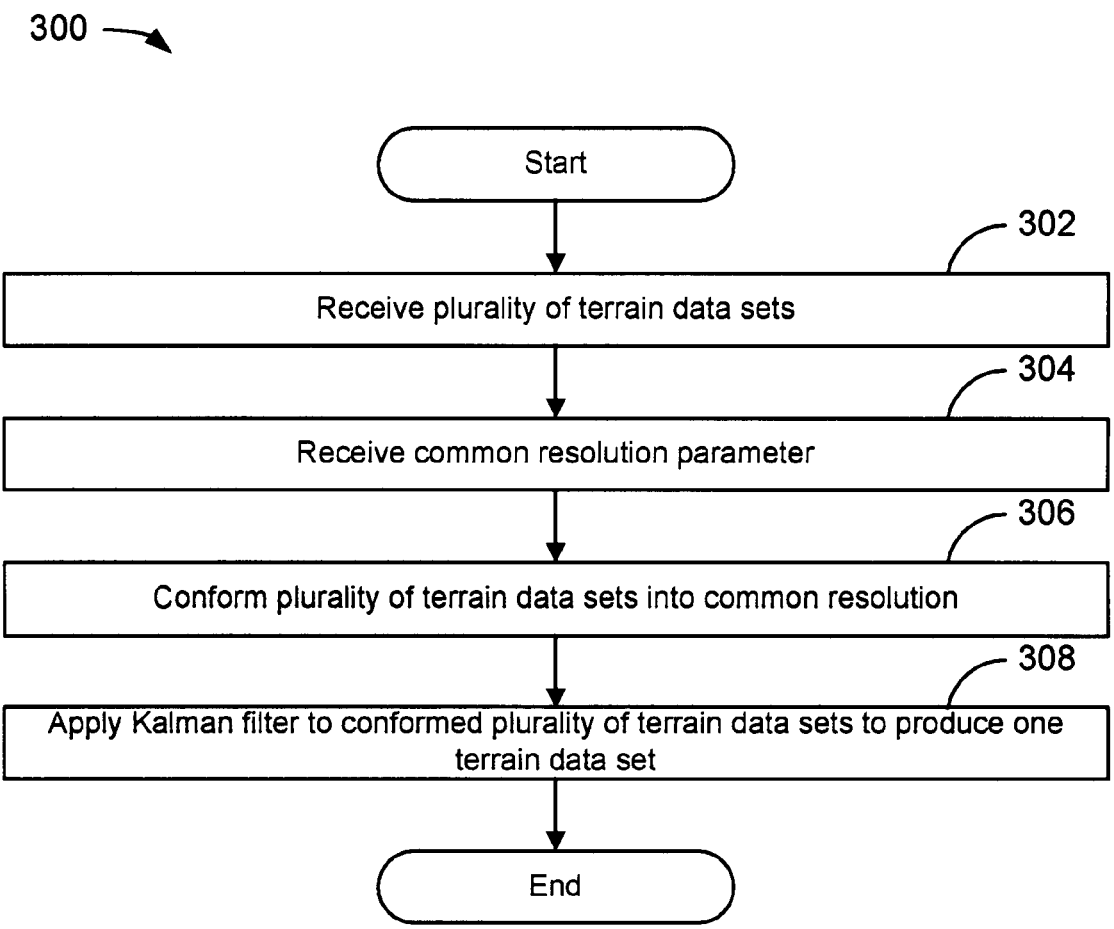
FIG. 3 depicts a flowchart illustrating a Kalman filter method for combining terrain elevation data from a plurality of terrain elevation data sets into terrain elevation data of a single, combined terrain elevation data set having a common resolution.

FIG. 3 depicts flowchart 300 of an example of a method for combining a plurality of terrain databases into one terrain database. The flowchart begins with modules 302, 304, and 306 which may perform the same steps as modules 202, 204, and 206, respectively. The flowchart continues to module 308 with the application of a Kalman filter. A Kalman filter may be regarded as an optimal solution to many tracking and data prediction tasks. The Kalman filter is an efficient recursive filter that estimates the state of a dynamic system from a series of incomplete and noisy measurements. Terrain elevation data sets may be viewed as a set containing noisy measurements. The GTOPO30 terrain data set provides a very smooth surface with very few abrupt changes in elevations; it is low resolution, continuous, and virtually free of high-frequency noise. On the other hand, SRTM terrain elevation data set is high resolution and often contains high-frequency noise caused by radar artifacts of the Interferometric Synthetic Aperture Radar technique employed during the Shuttle mission to acquire the SRTM data. For instance, application of a Kalman filter could provide a better estimate of the series of incomplete noisy measurements of the SRTM data when applied against GTOPO30 data. The utilization of a Kaman filter is known to those skilled in the art. The application of the Kalman filter results with the production of a combined terrain data set having a common resolution. Then, the flowchart proceeds to the end.

It should be noted that the method steps described above are embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system of combining a plurality of terrain data sets into one terrain data set, the system comprising:
   a plurality of terrain data sets, wherein each terrain data set is stored in a digital file having a file format and is comprised of digital terrain elevation data having an elevation data resolution, where such elevation data resolution is a resolution other than the elevation data resolution of the digital terrain elevation data of at least one other terrain data set within the plurality and is associated with a digital elevation model;
   a common resolution parameter representative of one elevation data resolution; and
   a processor, wherein such processor
   receives the plurality of terrain data sets and the common resolution parameter, conforms each terrain data set in which the elevation data resolution of the digital terrain elevation data is a resolution other than the one elevation data resolution of the common resolution parameter, such that the elevation data resolution of the digital terrain elevation data of each terrain elevation set will equal the one elevation data resolution of the common resolution parameter, and
   combines the digital terrain elevation data of each terrain data set to form one combined terrain data set, whereby such combined terrain data set is stored in a digital file having one file format and is comprised of digital terrain elevation data having the one elevation data resolution of the common resolution parameter.

2. The system of claim 1, wherein the combining of the digital terrain elevation data of each terrain data set to form one combined terrain data set includes transforming the terrain elevation data of each terrain data set into terrain frequency data of a corresponding terrain frequency set to form a plurality of terrain frequency sets from which the one combined terrain data set is formed.

3. The system of claim 1, wherein the processor conforms the digital terrain elevation data of each terrain data set of which the file format does not match the one file format, such that the file format of such terrain data set will match the one file format.

4. The system of claim 1, further comprising:
a plurality of error metric sets, wherein each error metric set comprises per-point error metric data corresponding to the digital terrain elevation data of one of the plurality of terrain data sets.

5. The system of claim 4, wherein the per-point error metric data comprise values representative of the quality of the digital terrain elevation data.

6. The system of claim 1, further comprising:
a plurality of elevation data error metric sets, wherein each elevation data error metric set comprises per-point error metric data corresponding to the digital terrain elevation data of one of the plurality of terrain data sets, such that the processor
receives the plurality of elevation data error metric sets, and
modifies the digital terrain elevation data with corresponding per-point error metric data, whereby the digital terrain elevation data having the one elevation data resolution of the common resolution parameter is weighted by its corresponding error metric data.

7. The system of claim 6, wherein the processor forms the one combined terrain data set by summing together the weighted digital terrain elevation data of each terrain data set of the plurality of terrain data sets.

8. The system of claim 7, wherein the processor normalizes the combined terrain data set if the sum of the plurality of error metric data sets is not equal to one.

9. The system of claim 2, wherein the processor forms the combined terrain data set by utilizing a Kalman filter to filter the terrain frequency data of each terrain frequency set.

10. A method of combining a plurality of terrain databases into one terrain database, the method comprising:
receiving a plurality of terrain data sets, wherein each terrain data set is stored in a digital file having a file format and is comprised of digital terrain elevation data having an elevation data resolution, where such elevation data resolution is a resolution other than the elevation data resolution of the digital terrain elevation data of at least one other terrain data set within the plurality and is associated with a digital elevation model;
receiving a common resolution parameter representative of one elevation data resolution;
conforming each terrain data set in which the elevation data resolution is a resolution other than the one elevation data resolution of the common resolution parameter, such that the elevation data resolution of each terrain elevation set will equal the one elevation data resolution of the common resolution parameter;
receiving a plurality of elevation data error metric sets, wherein each elevation data metric set corresponds to one of the plurality of terrain data sets;
applying each of the plurality of elevation data error metric sets as a weight to its corresponding terrain data set;
combining the plurality of weighted, terrain data sets to form one combined terrain data set, whereby such combined terrain data set is stored in a digital file having one file format and is comprised of digital terrain elevation data having the one elevation data resolution of the common resolution parameter; and
normalizing the combined terrain data set.

11. The method of claim 10, further comprising:
conforming the digital terrain elevation data of each terrain data set of which the file format does not match the one file format, such that the file format of such terrain data set will match the one file format.

12. The method of claim 10, wherein each elevation data error metric set of the plurality of error metric sets comprises per-point error metric data corresponding to the digital terrain elevation data of one of the plurality of terrain data sets.

13. The method of claim 12, wherein the per-point error metric data comprise values representative of the quality of the digital terrain elevation data.

14. A method of combining a plurality of terrain databases into one terrain database, the method comprising:
receiving a plurality of terrain data sets, wherein each terrain data set is stored in a digital file having a file format and is comprised of digital terrain elevation data having an elevation data resolution, where such elevation data resolution of each terrain data set is a resolution other than the elevation data resolution of the digital terrain elevation data of at least one other terrain data set within the plurality and is associated with a digital elevation model;
receiving a common resolution parameter representative of one elevation data resolution;
conforming each terrain data set in which the elevation data resolution is a resolution other than the one elevation data resolution of the common resolution parameter, such that the elevation data resolution of each terrain elevation set will equal the one elevation data resolution of the common resolution parameter;
transforming the terrain elevation data of each terrain data set into terrain frequency data of a corresponding terrain frequency set to form a plurality of terrain frequency sets; and
combining the plurality of terrain data frequency sets to form one combined terrain data set by utilizing a Kalman filter, whereby such combined terrain data set is stored in a digital file having one file format and is comprised of digital terrain elevation data having the one elevation data resolution of the common resolution parameter.

15. The method of claim 14, further comprising:
conforming the digital terrain elevation data of each terrain data set of which the file format does not match the one file format, such that the file format of such terrain data set will match the one file format.

* * * * *